No. 835,331. PATENTED NOV. 6, 1906.
J. A. STUBKJARE.
HOOF TRIMMING TOOL.
APPLICATION FILED MAR. 5, 1906.

WITNESSES

INVENTOR
JOSEPH A. STUBKJARE
BY
HIS ATTORNEYS

UNITED STATES PATENT OFFICE.

JOSEPH A. STUBKJARE, OF MOHALL, NORTH DAKOTA.

HOOF-TRIMMING TOOL.

No. 835,331.  Specification of Letters Patent.  Patented Nov. 6, 1906.

Application filed March 5, 1906. Serial No. 304,161.

*To all whom it may concern:*

Be it known that I, JOSEPH A. STUBKJARE, of Mohall, county of Ware, North Dakota, have invented certain new and useful Improvements in Hoof-Trimming Tools, of which the following is a specification.

The object of my invention is to provide a power-operated tool by means of which a hoof can be easily and quickly trimmed preparatory to placing a shoe thereon.

The invention consists, generally, in a revolving tool having wings provided with cutting and rasping edges.

Figure 1:
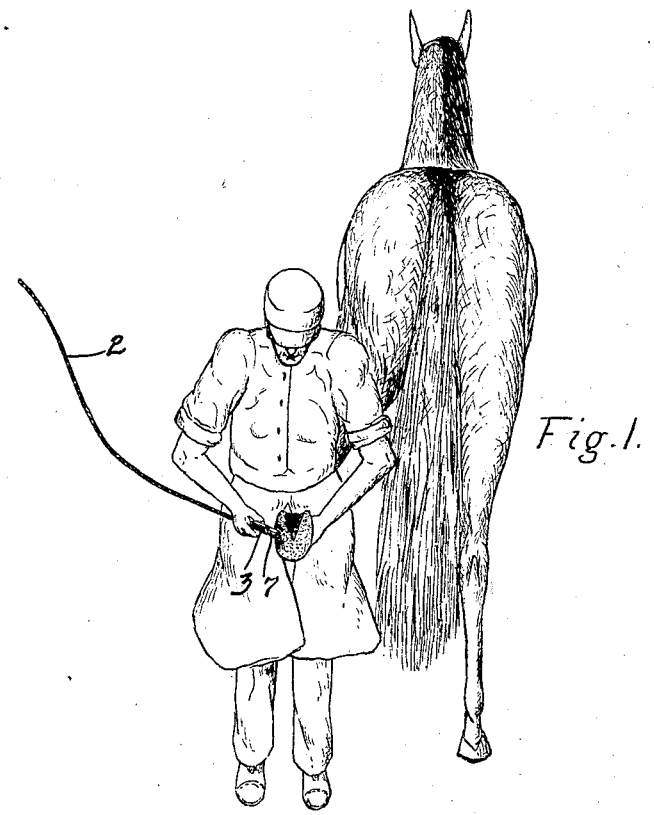
Figure 2:
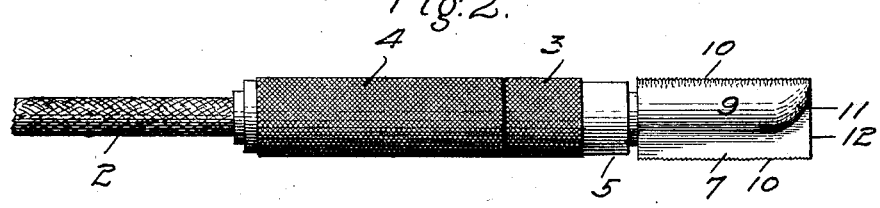
Figure 3:
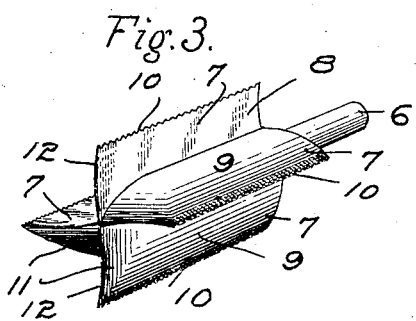
Figure 4:
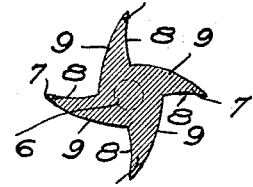

In the accompanying drawings, forming part of this specification, Figure 1 is a perspective view illustrating the tool in use. Fig. 2 is a detail view of the tool-holder and the tool mounted therein. Fig. 3 is a perspective view of the tool, and Fig. 4 is a transverse sectional view.

In the drawings, 2 represents a flexible shaft driven from a suitable source of power, such as an electric motor. (Not shown.) 3 is a tool-holder having a handle 4 to be grasped by the operator, and jaws 5 in which the shank 6 of the trimming-tool is secured, the jaws being attached to the flexible shaft and adapted to revolve therewith, such attachment being made in any suitable way and the jaws being adapted to grip and hold the shank of the tool in the manner corresponding to the jaws of ordinary tool-holders. A shank 6 is provided with a series of radiating wings 7 (preferably four) extending longitudinally on the shank and having concave surfaces 8 on one side and convex surfaces 9 on the other. The longitudinal edges of the wings 7 have transverse corrugations 10 therein, forming rasping-surfaces corresponding substantially with the surface of a file and adapted to take the place of such a tool in smoothing off the trimmed portions of the hoof. The forward ends of the wings have beveled surfaces 11, terminating in cutting edges 12, which radiate from the shank 6 and when applied to the hoof will very quickly trim or cut away the surplus growth thereon and form a flat surface to receive the shoe. The end of the tool may be presented to the shoe or the longitudinal edges of the wings, according to the part of the hoof therein being trimmed and the convenience of the operator. When the required amount of trimming has been performed, the convex edge of the tool having the roughened surface may be used to trim and smooth up the hoof and more perfectly fit the shoe thereon. Tools having different-shaped wings may be employed, some having finer corrugations in their edges than others and being used for the finishing work, while others may have wider and deeper corrugations or broader cutting edges at the ends to adapt them for the preliminary trimming. A tool can be readily removed from the holder and another substituted therefor very easily and quickly, while the blacksmith is holding the hoof and preparing it for the shoe. The wings or blades on the trimming-tool may be of any suitable length, and there may be any desired number of them on each tool.

I claim as my invention—

1. The combination with a flexible shaft and a tool-holder mounted thereon, of a hoof-trimming tool having its shank secured in said holder and comprising a series of wings radiating from said shank and having longitudinal and transverse cutting edges, said wings being concave on one side and convex on the opposite side and provided with corrugations on said convex surfaces forming longitudinal rasping-surfaces, substantially as described.

2. The combination with a flexible shaft and a tool-holder secured thereon, of a hoof-trimming tool having its shank secured in said holder and provided with a series of longitudinally-arranged wings radiating from said shank, the outer ends of said wings being rounded or beveled and having cutting edges radiating from said shank, and said wings being convex on one side and having rasping-surfaces near their longitudinal edges, substantially as described.

3. The combination, with a flexible shaft and a tool-holder mounted thereon, of a revolving hoof-trimming tool mounted in said holder and comprising a shank and a series of wings radiating therefrom, and having longitudinal cutting edges and roughened or rasping surfaces, substantially as described.

4. The combination, with a flexible shaft and a tool-holder mounted thereon, of a hoof-trimming tool mounted in said holder and comprising a shank and wings radiating therefrom, said wings having transverse cutting edges and surfaces provided with corrugations for the purpose specified.

5. The combination, with a flexible shaft, and a tool-holder mounted thereon, of a hoof-trimming tool having a shank secured in said holder and a series of wings radiating from said shank, said wings having longitudinal cutting edges and having convex surfaces provided with corrugations forming rasping-surfaces, substantially as described.

6. The combination, with a flexible shaft and a tool-holder mounted thereon, of a hoof-trimming tool having its shank secured in said holder and comprising a series of wings radiating from said shank, said wings being concave on one side and convex on the opposite side and provided with corrugations on said convex surfaces forming longitudinal, rasping-surfaces, substantially as described.

In witness whereof I have hereunto set my hand this 28th day of February, 1906.

JOSEPH A. STUBKJARE.

Witnesses:
W. W. STEELE,
K. H. KANNE.